United States Patent [19]

Ortega

[11] Patent Number: 4,472,883

[45] Date of Patent: Sep. 25, 1984

[54] STRUCTURAL MOVEMENT MEASURING DEVICE

[76] Inventor: Richard I. Ortega, One South West Street, Media, Pa. 19063

[21] Appl. No.: 425,526

[22] Filed: Sep. 28, 1982

[51] Int. Cl.³ .............................................. G01B 5/00
[52] U.S. Cl. .................................. 33/180 R; 33/1 H;
33/147 D; 33/462; 52/105; 73/786
[58] Field of Search ........ 33/1 N, 1 H, 1 MP, 180 R,
33/181 AT, 147 D, 412, 456, 460, 461, 462, 457,
430, 443, 436; 73/786, 787; 52/105

[56] References Cited

U.S. PATENT DOCUMENTS

| | | |
|---|---|---|
| 224,401 | 2/1880 | Derickson . |
| 662,977 | 12/1900 | Schmelz . |
| 798,721 | 9/1905 | Wilson . |
| 1,023,242 | 4/1912 | Childs . |
| 1,582,620 | 4/1926 | Ostrander ............................ 33/188 |
| 1,622,158 | 3/1927 | Liberty .................................. 33/462 |
| 1,759,219 | 5/1930 | Bowlus . |
| 1,894,886 | 1/1933 | Paskowski . |
| 3,842,509 | 10/1974 | Wyman et al. ..................... 33/180 R |
| 4,115,925 | 9/1978 | Malak ................................. 33/181 R |
| 4,150,490 | 4/1979 | Sluka .................................... 33/1 H |

FOREIGN PATENT DOCUMENTS

| | | |
|---|---|---|
| 1208267 | 9/1959 | France . |
| 500668 | 11/1954 | Italy ..................................... 33/161 |
| 1718 | of 1904 | United Kingdom ............ 33/143 G |
| 561106 | 5/1944 | United Kingdom . |

OTHER PUBLICATIONS

Avongard Products, U.S.A., 2836 Osage, Waukegan, IL 60085 Phone: (312) 244-4179 brochure page for TELL-TALE device.

Primary Examiner—William D. Martin, Jr.
Attorney, Agent, or Firm—Price, Heneveld, Huizenga & Cooper

[57] ABSTRACT

The specification discloses a device for detecting movement of two portions of a structure relative one another. The device comprises a first disc defining a radial scale and fixedly securable to the first portion of the structure and a second disc fixedly securable to the second portion of the structure. A telescoping linear scale extends between and is pivotally secured to the center of the radial scale and to the second disc. Consequently, the angular orientation of the telescoping scale with respect to the first disc is displayed on the radial scale; and the distance between the disc members is displayed on the linear scale, providing a measurement of movement between the structural portions. Also disclosed is a method of detecting structure movement comprising securing the device to the two portions of the structure and monitoring subsequent readings displayed on the radial and linear scales.

8 Claims, 6 Drawing Figures

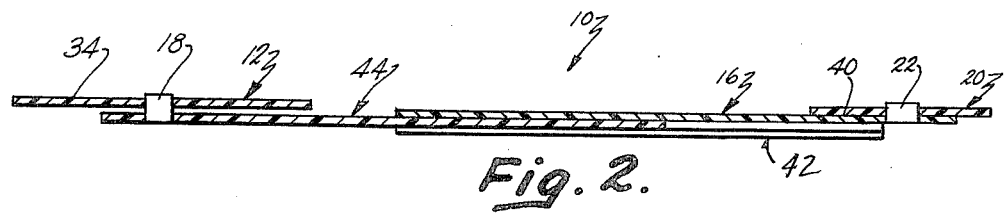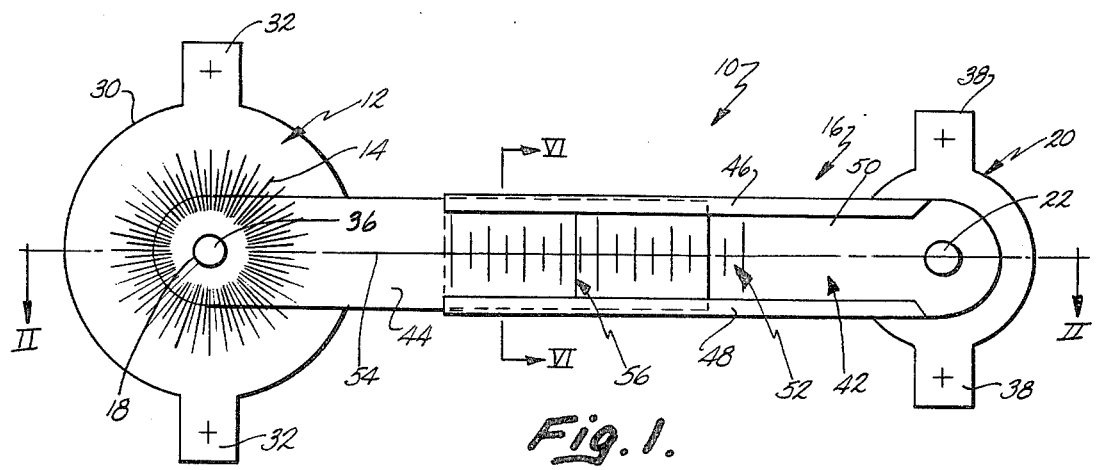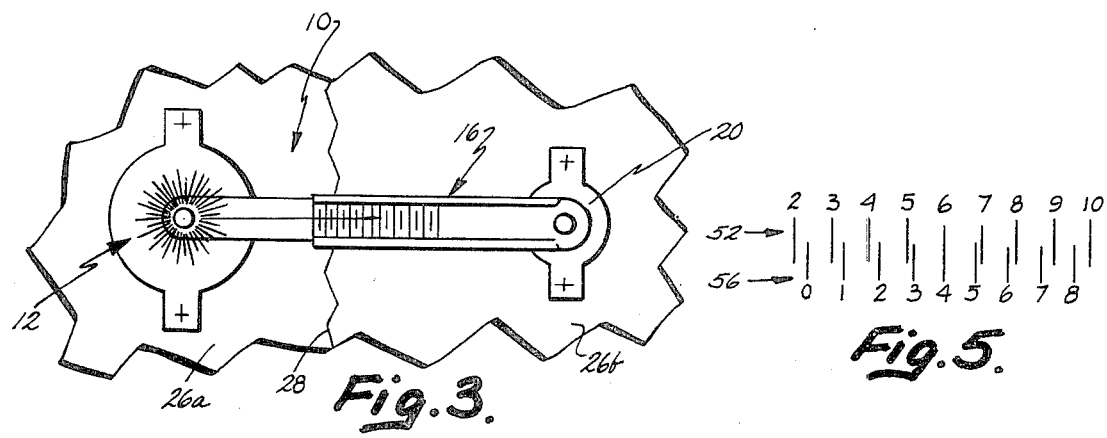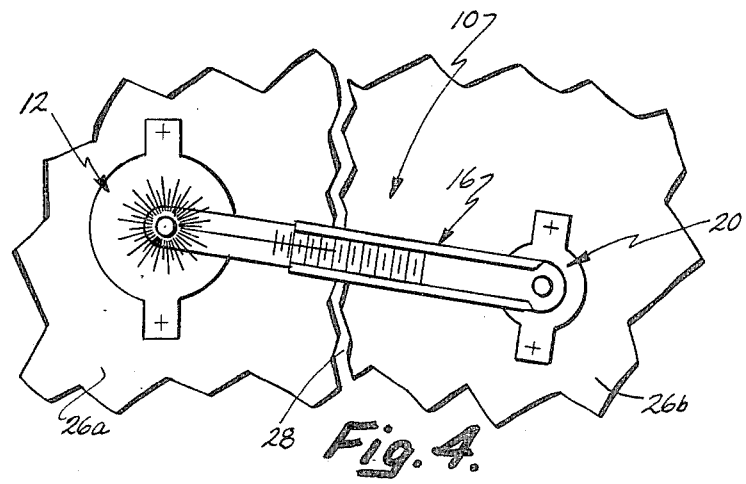

STRUCTURAL MOVEMENT MEASURING DEVICE

BACKGROUND OF THE INVENTION

The present invention relates to a device for measuring movement within a structure, and more particularly to a device for measuring relative movement between two portions of a structure.

It is often desirable to monitor the movement of the components of a structural assembly. A history of the movement provides information indicative of structural integrity, strains, stresses, loads, fatigue, and rigidity. Particularly important is the observation of two portions of a structure relative one another, such as the movement of a masonry wall along a break or fault in the wall. As referred to in this application, masonry concrete, stone, brick, or any other type of structural wall typically poured or laid. By monitoring movement of the masonry wall along the crack, one can determine the problems causing the wall movement and take appropriate corrective action to properly prevent further deterioration.

Although several devices are known for measuring the movement of a masonry wall along a fault, these devices are not without their drawbacks. One such device is manufactured by Avongard Products of England under the trademark TELL-TALE. The TELL-TALE device includes a first arm securable to the wall on one side of the fault and a second arm securable to the wall on the other side of the fault. Each arm includes a transparent portion defining a Cartesian grid with the grids superimposed over one another. Movement of the wall on either side of the fault causes the grids to shift relative one another providing a crude indication of relative wall movement. However, the TELL-TALE device does not provide the desired accuracy of measurement. The superimposed Cartesian grids are difficult both to read and to subsequently analyze the derive information regarding both the angular and linear movement of the one wall portion with respect to the other.

A second method of detecting wall movement is to secure two straight rulers on either side of the crack perpendicular one another across the crack. As the wall portions move, the rulers will provide a crude indication of relative wall movement. However, calculation of wall movement based on ruler positions is, to say the least, difficult, if not impossible. Further, the straight rulers can be easily bumped or nudged off the wall requiring the entire process to be restarted.

Other mechanical devices for detecting structural movement involve specially calibrated, demountable dial micrometers which measure between pins, or discs, affixed to the wall and across the crack in a triangular pattern. These devices, however, are very expensive; and furthermore, are subject to operator error and "background noise" problems because they are too sensitive.

SUMMARY OF THE INVENTION

The aforementioned problems are solved by the present invention comprising an inexpensive, yet highly accurate, structural movement measuring device providing precise angular and linear measurements of relative movement between two portions of a structure. More particularly, the measuring device comprises (1) a disc member defining a radial scale and (2) a telescoping linear scale including a first end pivotally secured to the disc at the center of the radial scale. The device further comprises means for fixedly securing the disc to a first structural portion and means for pivotally securing a second, opposite end of the telescoping linear scale to a second structural portion. Subsequent relative movement between the two structural portions results in both (1) pivotal movement between the telescoping assembly and the disc, which is displayed on the radial scale, and (2) telescoping of the linear scale, which is displayed on that linear scale. With the precise angular and linear information provided by the device, the relative movement between the structural portions may be calculated with high accuracy. The device comprises relatively few parts, all of which may be inexpensively manufactured so that the device is relatively inexpensive. Third, the device can be easily used and read by virtually anyone.

These and other objects, advantages, and features of the invention will be more readily understood and appreciated by reference to the written specification and appended drawings.

BRIEF DESCRIPTION OF THE DRAWINGS

FIG. 1 is an elevational view of the measuring device of the present invention;

FIG. 2 is a sectional view taken along plane II-13 II in FIG. 1;

FIG. 3 is an elevational view of the measuring device installed on a masonry wall;

FIG. 4 is an elevational view of the measuring device installed on a masonry wall which has moved from the position shown in FIG. 3;

FIG. 5 is an enlarged view of the linear scale imprinted on the telescoping portion of the device; and FIG. 6 is a sectional view taken along plane VI—VI in FIG. 1.

DETAILED DESCRIPTION OF THE PREFERRED EMBODIMENT

A structural movement measuring device constructed in accordance with a preferred embodiment of the invention is illustrated in the drawings and generally designated 10. The device (FIG. 1) includes disc 12 defining radial scale 14 and telescoping arm 16 pivotally connected to disc 12 by rivet 18. Telescoping arm 16 defines linear scale 24 and is also pivotally connected to disc 20 by rivet 22.

In use, the device is installed on a masonry wall 26, as shown in FIG. 3, by fixedly securing discs 12 and 20 to the wall on opposite sides of a break or fault 28. The initial angular orientation of arm 16 with respect to disc 12 is then read on radial scale 14. Additionally, the distance between discs 12 and 20 is noted on linear scale 24. Subsequently, both radial scale 14 and linear scale 24 are read to note changes as the two wall portions 26a and 26b move or shift relative one another. One such subsequent position is illustrated in FIG. 4 wherein it is seen that fault 28 is somewhat widened over the initial position shown in FIG. 3 and that the right-hand portion of the wall has moved downwardly. Both radial scale 14 and linear scale 24 have changed from the initial readings. Standard trigonometric equations may then be used to determine the exact shift of disc 20 with respect to disc 12 to provide an accurate determination of relative wall movement. When several readings are made over a period of time, the pattern of wall movement provides important information indicative of the causes of wall movement along fault 28.

Turning more specifically to the construction of measuring device 10, disc 12 (FIGS. 1 and 2) is a generally planar, disc-shaped member defining a circumference 30 and formed from opaque or transparent, thin, somewhat flexible, sheet material such as paper or plastic sheeting including polyvinylchloride. Other materials may also be used. A pair of nailing tabs 32 extend diametrically or radially from disc 30 in opposition to one another to receive nails or other elongated fasteners therethrough. Additionally, rear surface 34 (FIG. 2) includes a coating of suitable adhesive which is tacky or adherent at temperatures at which the device 10 will be used normally, i.e., $-25°$ F. to $+150°$ F. Thus, surface 34 is self-adhesive. One suitable adhesive is Scotch Grip 4910 manufactured by 3M Company. Radial scale 14 (FIG. 1) is scribed, printed or molded on disc 12 and includes a center 36. Either degrees or radians are used as the units of measure on radial scale 14.

Disc 20 (FIGS. 1 and 2) is generally similar to disc 12 with the exceptions that disc 20 is smaller in diameter and does not include a radial scale. Included on disc 20 are a pair of opposing nailing tabs 38 and a coating on surface 40 making that surface self-adhesive. Again, disc 20 may be made from plastic, paper, or the like.

Telescoping arm 16 (FIGS. 1, 2 and 7) comprises first member 42 and second member 44 telescopically received within the first member. As most clearly seen in FIG. 7, first member 42 is generally C-shaped in cross section, comprising upper channel 46 and lower channel 48 interconnected by body portion 50. Regular linear scale 52 is defined on the side of body 50 facing second member 44. Second member 44 is generally planar and telescopically received within first member 42 and more specifically within channels 46 and 48. Members 42 and 44 are preferably formed from plastic sheeting such that channels 46 and 48 may be molded or permanently bent therein. Member 44 is substantially transparent and include a cross hair or indicator means 54 aligned with center 36 of radial scale 14. Member 44 also defines, for example by scribing or printing, vernier scale 56 (see also FIG. 5) which provides an indicator means for registration with linear scale 52. As is well known, the vernier scale provides an extra degree of accuracy in the reading of scale 52. For example, the reading illustrated in FIG. 5 is 2.4.

Operation

Device 10 may be utilized to detect and monitor relative movement between two portions of virtually any structure, such as a skin membrane structure, a stress skin structure, a plastic wall, a masonry wall, or a pair of studs. In the preferred embodiment, device 10 is utilized to detect relative wall movement between two portions 26a and 26b (FIGS. 3 and 4) of a masonry wall separated by fault 28.

Device 10 is initially secured to wall 26 (FIG. 3) across fault 28 by securing discs 12 and 20 to wall portions 26a and 26b, respectively. Elongated fasteners, such as nails, are inserted through nailing tabs 32 and 38 and into the wall to fixedly secure the discs in position. Additionally, or alternatively, self-adhesive surfaces 34 and 40 are pressed against the wall to further secure the discs thereto. The fixed securement of disc 12 to wall 26 insures that radial scale 14 will not rotate meaning that any change in the angular orientation of arm 16 with respect to disc 12 is due solely to wall movement. Initial readings of both angular scale 14 and linear scale 52 are made by noting the registration of hair line 54 with the radial scale and the registration of vernier scale 56 with the linear scale. It is not important that either of these readings be zero at the time of installation; what is important is the relation of subsequent readings with respect to the initial readings.

The effect of subsequent relative wall movement between portions 26a and 26b is illustrated in FIG. 4 wherein fault 28 has become wider due to movement between wall portions 26a and 26b. As the wall portions move or shift, telescoping arm 16 pivots with respect to disc 12. Additionally, arm 16 telescopes to a shorter or longer length as discs 12 and 20 move relative one another. Periodically, readings are obtained from radial scale 14 and linear scale 52 so that, using standard trigonometric equations, the movement between discs 12 and 20 can be accurately and easily determined. By analyzing the history of wall movement, one can formulate potential causes of wall movement and take appropriate corrective action to arrest such movement.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A method of monitoring relative movement between first and second portions of a masonry wall on opposite sides of a break in the wall, said method comprising:
   pivotally securing a first end of a telescoping assembly to the center of a radial scale on the first wall portion, whereby the angular orientation of the assembly with respect to the radial scale is displayed on the radial scale;
   pivotally securing a second end of the telescoping assembly to the second wall portion, the assembly including a linear scale, whereby the distance between the first and second ends is displayed on the linear scale; and
   periodically noting the readings of the radial and linear scales and comparing the readings with prior readings to evaluate wall movement.

2. A method of monitoring relative movement between first and second wall portions of a building structure, said method comprising:
   pivotally securing a first end of a telescoping assembly to the center of a radial scale on the first wall portion, whereby the angular orientation of the assembly with respect to the radial scale is displayed on the radial scale;
   pivotally securing a second end of the telescoping assembly to the second wall portion, the assembly including a linear scale, whereby the distance between the first and second ends is displayed on the linear scale; and
   periodically noting the readings of the radial and linear scales and comparing the readings with prior readings to evaluate wall movement.

3. A method as defined in claim 1 further comprising fixedly securing the radial scale to the first wall portion by inserting at least two elongated fasteners through the radial scale and into the first wall portion.

4. A method as defined in claim 1 further comprising adhesively securing the radial scale to the first wall portion.

5. A method as defined in claim 1 wherein the linear scale comprises a vernier scale, said step of noting the readings including reading the vernier scale, whereby the accuracy of said noting step is improved.

6. A method as defined in claim 2 further comprising fixedly securing the radial scale to the first wall portion by inserting at least two elongated fasteners through the radial scale and into the first wall portion.

7. A method as defined in claim 2 further comprising adhesively securing the radial scale to the first wall portion.

8. A method as defined in claim 2 wherein the linear scale comprises a vernier scale, said step of noting the readings including reading the vernier scale, whereby the accuracy of said noting step is improved.

* * * * *